United States Patent
Garzia

[15] 3,697,563
[45] Oct. 10, 1972

[54] (3,4,5-TRIMETHOXY-BENZAMIDO)-ALKANOIC ACIDS FOR PROPHYLAXIS AND TREATMENT OF CARDIAC DISORDERS

[72] Inventor: Aldo Garzia, Lodi, Italy

[73] Assignee: Istituto Chemioterapico Italiano S.p.A.

[22] Filed: June 29, 1970

[21] Appl. No.: 50,949

Related U.S. Application Data

[63] Continuation-in-part of Ser. No. 840,841, July 10, 1969.

[52] U.S. Cl. .................260/404, 260/519, 424/318, 424/319
[51] Int. Cl. ..............................................C09f 7/00
[58] Field of Search .......260/404, 519; 424/318, 319

[56] References Cited

UNITED STATES PATENTS

| | | | |
|---|---|---|---|
| 2,519,038 | 8/1950 | Galat | 260/518 |
| 2,702,820 | 2/1955 | Tummes et al. | 260/518 |
| 2,870,145 | 1/1959 | Gaston | 260/247.2 |
| 2,987,544 | 6/1961 | Horrom | 260/559 |
| 3,330,866 | 7/1967 | Schmidt | 260/559 |
| 2,729,657 | 1/1956 | Krems | 260/404 |
| 3,489,793 | 1/1970 | Bertelli | 260/519 |
| 3,509,208 | 4/1970 | Alburn et al. | 260/519 |

OTHER PUBLICATIONS

Razzaboni et al., "Pharmacological Investigations on the Derivatives of E– Amino Caproic Acid"
Bianchi et al., "Compounds Structurally Related to Thalidomide etc;" (1965) CA64 pp. 19480– 81 (1966)

*Primary Examiner*—Lewis Gotts
*Assistant Examiner*—G. Hollrah
*Attorney*—John W. Behringer, Eugene L. Bernard, Martin J. Brown, W. Brown Morton, Jr., James N. Dresser, John T. Roberts, Malcolm L. Sutherland and Morton, Bernard, Brown, Roberts & Sutherland

[57] ABSTRACT

(3,4,5-Trimethoxy-benzamido)-alkanoic acids and their pharmaceutically-acceptable salts for propyhylaxis and treatment of cardiac disorders.

5 Claims, No Drawings

(3,4,5-TRIMETHOXY-BENZAMIDO)-ALKANOIC ACIDS FOR PROPHYLAXIS AND TREATMENT OF CARDIAC DISORDERS

This application is a continuation-in-part of my copending application Ser. No. 840,841, filed July 10, 1969.

BACKGROUND OF THE INVENTION

This invention relates to a method of prophylaxis and treatment of cardiac disorders. In a particular aspect, it relates to a method of treating ischemic cardiopathy prior to or following a cardiac infarction, disorders of rhythm, and disorders of stimulus transmission by the administration of an aminoalkanoic acid derivative.

The prevention and treatment of cardiac disorders, such as ischemia, thrombosis, cardiac infarction and disorders of rhythm and stimulus transmission, is a serious problem. Many studies have been conducted in an effort to ascertain the underlying causes and to develop a suitable method of preventing or treating these serious problems, particularly cardiac insufficiency and cardiac infarction. The pharmacological methods which have been proposed for preventing cardiac infarction include lowering of blood cholesterol levels, relaxation of the arteries and administration of anticoagulants. Ventricular fibrillation is a highly dangerous condition which is treated by electric shock administered to the heart muscle, and other rhythm and transmission disorders respond to installation of the "-pacemaker" device.

While the use of these methods has greatly improved the prognosis of cardiac patients, the problem of cardiac disorders generally still remains a severe one and in particular the problems caused by infarction are still grave.

SUMMARY OF THE INVENTION

It is an object of this invention to provide a method of prophylaxis and treatment of cardiac disorders.

It is another object of this invention to provide novel pharmaceutical compostions suitable for the prophylaxis and treatment of cardiac disorders.

Another object of this invention is to provide a method of prophylaxis and prevention of ischemic cardiopathy, cardiac infarction and disorders of rhythm and stimulus transmission by the administration of derivatives of aminoalkanoic acids.

Other objects of this invention will be readily apparent to those skilled in the art from the disclosure herein.

It has been discovered that administration of compounds corresponding to the following formula

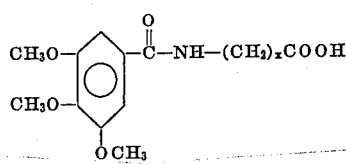

where $x$ is an integer of 3–8, or their pharmaceutically-acceptable salts, is effective in the prophylaxis and treatment of cardiac disorders such as cardiac ischemia and infarction, disorders of rhythm and disorders of stimulus transmission. The compound is administered at a dosage of 2–8 grams per day per average 60–70 kg. individual. When administration is by intravenous or intraperitioneal injection, soluble pharmaceutically acceptable salts of the compounds of this invention are preferred.

DETAILED DISCUSSION

The compounds of the present invention include γ-(3,4,5-trimethoxybenzamido)-butyric acid; δ-(3,4,5-tri-methoxybenzamido)-valeric acid; ε-(3,4,5-trimethoxybenz-amido)-caproic acid; ζ-(3,4,5-trimethoxybenzamido)-heptanoic acid; η-(3,4,5-trimethoxybenzamido)-octanoic acid; θ-(3,4,5-trimethoxybenzamido)-nonanoic acid; and pharmaceutically-acceptable salts thereof. The caproic acid derivative is preferred and will be denoted hereinafter as C-3.

These compounds are prepared by reacting 3,4,5-trimethoxybenzoyl chloride with the corresponding amino-alkanoic acid at a temperature of about −5 to +5°C. According to the process of this invention, the free amino acid is slurried in about an equal weight of water and is neutralized with sodium hydroxide solution (about 30 percent by weight). The mixture is chilled to within −5°C to +5°C, and 3,4,5-tri-methoxybenzoyl chloride is gradually added with agitation, maintaining the temperature at below 5° C. The mole ratio of amino acid to the acid chloride is generally about 1–1.5:1. The resulting solution is preferably treated with char to decolorize it, the char is separated, e.g., filtered, and the filtrate neutralized with dilute HCl or $H_2SO_4$ to about a Congo red indicator endpoint. The resulting precipitate is separated, e.g., by filtration or centrifugation, washed with water, dried, then recrystallized from ethanol, separated by filtration, centrifugation or decantation and dried. 3,4,5-trimethoxybenzoyl chloride and ε-amino-caproic acid are available in commercial quantity and the commercial grade materials are suitable for preparing the products of this invention. The corresponding aminovaleric, aminobutyric, aminoheptanoic, aminooctanoic and aminononanoic acids are prepared by known methods by the HCl-catalyzed hydrolysis of the corresponding lactams, which are known in the art. The salts thus obtained are then passed through an ion-exchange resin bed to obtain the free amino acid.

According to the method of the present invention, compounds corresponding to the formula given hereinbefore are administered for the treatment of cardiac ischemic, either prior to or following a cardiac infarction, disorders of the rhythm whether related to infarction or not, and disorders of stimulus transmission. Administration of these compounds is an effective prophylaxis in cases of an impending cardiac infarction and an effective treatment after infarction has occurred. According to one embodiment of the present invention, the method is employed in veterinary medicine, principally in the treatment of household pets, especially dogs, where cardiac problems are frequently encountered.

Cardiac infarction frequently occurs without prior symptoms or before the patient has sought treatment for the relief of symptoms. However physicians are frequently able to detect symptoms of an approaching crisis and the administration of the compounds of this invention can be started promptly to obtain prophylactic effects.

The products of the present invention are of a low-order of toxicity and no side effects were observed in clinical trials. Pharmacological studies indicated that C–3 exerts its principal effect on the heart. The only observed effect on the circulatory system was an increase in the static blood pressure with no significant change in mean arterial pressure.

The dosage in which the compounds of the present invention can be given can vary widely within rather broad limits. Good results have been obtained with as little as 25 mg/kg/day and as much as 500 mg/kg/day. In human clinical cases, all of the disorders cited above generally respond to a dosage of 2–8 grams per day per person, preferably about 6 grams per day. This dosage is intended for an average 60–70 kg individual, equivalent to a dosage generally within the range of about 25–200 mg/kg/day. A dosage in the range of about 40–100 mg/kg/day is preferred. The treatment can consist of a single daily dose, or the above dosages can be given fractionally at periodic intervals. A single daily dose is generally preferred for treatment of cardiac infarction and associated disorders but for prophylaxis, smaller periodic doses, e.g., a 50 mg dose, six times daily, is preferred.

Administration of the compounds of this invention can be oral, subcutaneous, intravenous or intraperitoneal. When the compounds of the present invention are by subcutaneous, intraperitoneal or intravenous injection, they are administered as their water-soluble neutral salts. Any soluble, pharmaceutically-acceptable salt is suitable and the sodium and potassium salts are preferred. The sodium salt is particularly preferred. For oral administration the compounds are preferably administered as the free acids but they can also be pharmaceutically-acceptable salts, e.g., as the ammonium, sodium, potassium, magnesium or calcium salt. According to one suitable method, the free acids can be administered mixed with a molar equivalent of sodium or potassium bicarbonate. In the examples, C–3 was administered intraperitoneally as the sodium salt because of its ease of handling as an aqueous solution, but the weights given are for the free acid. When administered orally, the compounds are conveniently administered as tablets containing 500 mg with a suitable binder, many of which are known.

Suitable tablets for human or animal use can conveniently be prepared containing 50–500 mg of the compounds of the present invention, either as the free acid or as a pharmaceutically-acceptable salt thereof. Tablets containing as little as 50 mg are suitable for oral administration, especially for infants and small children, and in veterinary medicine, for small animals. Tablets containing less than 50 mg can be prepared, and in special cases may be useful, but generally a dose smaller than 50 mg is too small to be practical because in the average patient the number of tablets required per day would be excessively high for convenience. Tablets containing more than 500 mg can also be prepared, but large tablets are difficult for most patients to swallow.

EXAMPLE 1

ε-Aminocaproic acid, 26.2 g (0.2 mole) was dissolved in 30 ml water and was neutralized with 12.2 g of NaOH dissolved in 30 ml water. The mixture was chilled to 0°–5° C and 36 g (0.15 mole) of 3,4,5-trimethoxybenzoyl chloride was gradually added with agitation, maintaining the temperature at 5°C or below. The resulting solution was treated with char, filtered and acidified with dilute HCl to a Congo red indicator end-point, during which time a precipitate formed. It was filtered, washed with water, dried and was then recrystallized from hot ethanol. The crystals were then filtered and dried to yield 44 g of ε-(3,4,5-trimethoxybenzamido)-caproic acid (C–3); m.p. 119°–120°, yield 90 percent.

The acute oral toxicity of C–3 was evaluated by converting the free acid to the sodium salt and administering to female rats weighting approximately 100 g. The oral $LD_{50}$ could not be established but it was higher than 6 g/kg (free acid basis), the maximum amount which could be administered. By intraperitoneal administration the $LD_{50}$ was 2.5 g/kg, which is 50 times the average contemplated daily dose. When administered by continuous intravenous infusion at a volume of 1 g/kg per minute to a maximum dose of 3 g/kg, the death rate was one out of eight animals.

In the female mouse, weighing approximately 20 g, the $LD_{50}$ by intraperitoneal administration was higher than 2.5 and lower than 3.0 g/kg; by oral administration the $LD_{50}$ was about 5 g/kg. By continuous intravenous infusion at a volume of 0.2 ml/min. (1 g/kg/min.) for a total dose of about 2.5 g/kg, C–3 caused the death of approximately 50 percent of the animals.

Tolerance tests were conducted in 30 female rats by daily, oral administration for 33 days of a dose of 500 mg/kg (5 percent solution), and a dose of 300 mg/kg (6 percent solution) by intraperitoneal administration. No noteworthy change could be noted in these tolerance tests. No mortality, no change in the body or in the weights of liver, kidney, suprarenal glands, heart, spleen, ovaries were observed. A moderate swelling of the liver and kidney were observed in the animals receiving C–3 and also in some of the controls, but it was regarded as of little significance as to specific toxicity of C–3.

EXAMPLE 2

The effect of C–3, prepared according to the procedure of Example 1, on the heart was determined in rats and rabbits by intravenous injection of 1 unit per kilogram of vasopressin (Pitressin, marketed by Parke, Davis Co.), an anti-diuretic pituitary hormone. As is known, the administration of vasopressin results in variations of the voltage and the morphology, or shape, of the T-wave. It also causes arrhythmia and produces ischemia of the myocardium. It was determined that these electrocardiographic alterations were prevented by the administration of C–3. No evidence of coronary dilation occurred as a result of the C–3 nor was there any apparent reduction of contractual power of the ventricle.

EXAMPLE 3

C-3, prepared in accordance with the procedure of Example 1 was further tested in rabbits for its effect on the heart. Artificial cardiac infarction was produced by tying the descending left coronary artery to completely shut off blood flow. Intraperitoneal administration of C-3 (sodium salt) was started in one group of animals one day prior to artery-tie. The C-3 was administered as a single intravenous dose of 50mg/kg per day plus a single intraperitoneal dose of 50 mg/kg per day. Death of one of these animals occurred, but the cause was not known. It was not due to cardiac infarction. In another group, administration of C-3 at the rate of 50 mg/kg for a total of 150 mg/kg was started after symptoms of cardiac infarction were well developed, i.e., about 10 after infarction. A third group was kept as control. The following results were obtained:

|  | Total No. | Died | Dose |
|---|---|---|---|
| Control | 24 | 9 | None |
| Treated before infarction | 14 | 1 | 100 mg/kg/day |
| Treated after infarction | 6 | 0 | 150 mg/kg/day |

The nature of the infarctual picture was checked daily by electrocardiogram. The seriousness of the infarction was determined by the presence of QS–complex in two precordial and at least in one peripheral lead, as is known to those skilled in the art. By this means, it was determined that the infarction was less serious in treated animals than in controls.

The influence of C-3 on rhythm disorders was evaluated employing two dosage schedules, that is the drug was administered either as a single daily dose of 100 mg/kg or in four daily divided doses of 200 mg/kg. Half of each dose was injected intravenously and half intraperitoneally. The rate of rhythm disorders, particularly the more severe ones, was far less in C-3 treated than in control animals. Moreover, the higher divided daily dosage acted more efficaciously than the lower, single dose.

Four rabbits from the group which received C-3 in a single daily dose of 50 mg/kg i.v. plus 50 mg/kg i.p. beginning the day before coronary ligature and continuing for five days thereafter were selected for histological tests. Three other rabbits served as control animals. Five days after the production of the infarct all the animals were bled to death, and their hearts removed. These hearts were quickly perfused with 10 percent formalin, fixed and stained by conventional methods. The most relevant histological findings were as follows: (a) the infarctual zone is more extended in untreated than in C-3 treated animals. Moreover in control rabbits anatomical damage involves not only subendocardial and subepicardial issue, as it happens in C-3 treated animals, but also the intramural tissue; (b) the macrophagic activity in the infarctual zone is far more pronounced in control than in treated animals; (c) C-3 treated rabbits, but not control animals, show an appreciable number of intact myocardial fibers mixed with the connective tissue replacing necrotic muscle cells.

The curative effect of C-3 in myocardial infarction of rabbits was evaluated in the group where treatment was started 8–10 hours after the ligature of the coronary artery. C-3 was injected into the 6 rabbits intraperitoneally in a dose of 50 mg/kg plus 50 mg/kg intravenously, four times a day until the end of experiments. Under the above conditions: (1) no death occurred within 6 days; (2) rhythm disturbance was completely absent; (3) only one animal presented the electrocardiographic patterns typical of a large infarct, whereas the electrocardiographic patterns of the other five rabbits were typical for a medium sized heart infarction. 6 Days after coronary artery occlusion the electrocardiographic patterns indicative of heart infarction had practically disappeared in all the animals.

EXAMPLE 4

C-3 prepared in accordance with Example 1 was administered orally to 50 clinical cases of cardiac disorders exhibiting symptoms of ischemic cardiopathy due to cardiac infarction, disorders of rhythm, and disorders of the stimulus transmission at a dosage of 3 g/day/person for 10 days in divided doses of 500 mg tablets (described in Example 9) given six times per day.

In 20 cases of coronary insufficiency due to myocardial infarction, an improvement was observed in the tolerance to effort as evidenced by a reduction in the number and intensity of stenocardiac attacks. On the second day after infarction the electrocardiogram was normal when treatment was started soon after the occurrence of the infarction but good results were obtained even if treatment was not started until 8 days after infarction.

In this group there were 20 cases of extrasystolic arrhythmia which showed improvement in the rhythm following administration of C-3.

Another 10 cases showed disorders of atrioventricular and intraventricular transmission of the stimulus. They were improved following administration of C-3.

EXAMPLE 5

3,4,5-trimethoxybenzamido-δ-valeric acid (m.p. 140°–141° C) was prepared in accordance with the procedure of Example 1 except that δ-amino-valeric acid was substituted for ε-aminocaproic acid. The resulting compound was tested for anti-Pitressin activity in rabbits as described in Example 2 and similar results were obtained.

EXAMPLE 6

3,4,5-trimethoxybenzamido-γ-butyric acid (m.p. 138°–140° C) was prepared in accordance with the procedure of Example 1 except that γ-aminobutyric acid was substituted for ε-aminocaproic acid. The resulting compound was tested for anti-Pitressin activity in rabbits as described in Example 2 and similar results were obtained.

EXAMPLE 7

3,4,5-trimethoxybenzamido-ζ-heptanoic acid, m.p. 142°–144° C, was prepared in accordance with the procedure of Example 1 except that ζ-aminoheptanoic acid was substituted for ε-aminocaproic acid. The resulting compound was tested for anti-Pitressen activity as described in Example 2 and similar results were obtained.

EXAMPLE 8

The experiment of Example 3 was repeated in all essential details except that ten mongrel dogs weighing 8–18 kg were used in place of rabbits. Five of them were untreated and served as control animals. The remaining 5 were treated with C–3 (sodium salt) at a dose of 1 g per animal administered subcutaneously, four times per day. The treatment was started 4 hours before coronary infarction and was continued daily thereafter. All of the untreated dogs died, but only one of the treated dogs died.

The results showed that in dogs, as in rabbits, treatment drastically lessens the electrocardiographic symptoms of cardiac infarction and reduces the mortality rate.

EXAMPLE 9

A pharmaceutical composition in tablet form was prepared by mixing 500 mg of C–3 with 50 mg of corn starch and 50 mg of sucrose. This mixture was compressed in a tableting machine to make a durable tablet. It is suitable for oral administration to humans or other animals suffering from cardiac disorders. It is particularly suitable for prophylaxis of a suspected impending coronary occlusion resulting in an infarction.

EXAMPLE 10

A pharmaceutical composition especially suitable for children and small animals is prepared according to the procedure of Example 9 except that the following amounts are employed: C–3, 50 mg; starch, 25 mg; sucrose, 25 mg.

EXAMPLE 11

A mixture of 30 grams (0.21 moles) of capryllactam, 23 cc. of concentrated hydrochloric acid and 75 cc of water is refluxed for one hour. It is neutralized with 50 percent aqueous sodium hydroxide and to the solution is added 21 grams of sodium hydroxide dissolved in 200 cc of water. To this solution maintained at 5°–10° C by an ice bath is added in two hours 61 grams of the chloride of 3,4,5-trimethoxybenzoic acid. This is left stirring overnight, then acidified with dilute hydrochloric acid. The precipitate thus obtained is recrystallized from an ethanol-water mixture to give a product melting at 117°–118° C. The product is θ-(3,4,5-trimethoxybenzamido)-octanoic acid.

EXAMPLE 12

In a 3-liter, 3-necked flask equipped with a thermometer and stirrer and cooled externally are put 332 grams (1.95 moles) of the hydrochloride of ε-aminocaproic acid and 300 cc of water. This solution is neutralized to the end-point of litmus by a 30 percent solution of sodium hydroxide (about 350 cc). To the clear solution thus obtained is added a cold solution of 122 grams of sodium hydroxide in 300 cc treated water. Holding the temperature between 5° and 10°C 360 grams (1.56 moles) of the chloride of 3,4,5-trimethoxybenzoic acid are added in portions in such a way that after each addition of the acid chloride almost complete solution is obtained. During this phase the reaction mass is gradually diluted with water in order to maintain the mixture sufficiently fluid; about one liter of water is necessary. After all the acid chloride has been added (about 1.5 hours) the mixture is stirred overnight at room temperature, then treated with active charcoal (2–S) and filtered into a 5-liter beaker. Then the solution is acidified with dilute hydrochloric acid to the Congo red end-point. The precipitate which forms is filtered and carefully washed with cold water until chloride ion is no longer present. The product is dried in an oven at 70°–80° C. The yield of crude product is 491 grams which is recrystallized from about 1200 cc of 99 percent ethanol, decolorizing with active carbon. After drying at 70°–80° C, 345 grams of white crystals of N-(3,4,5-trimethoxybenzoyl)-ε-aminocaproic acid are obtained having a m.p. of 121°–122° C. By concentration of the alcohol used for crystallization another 90 grams of pure product is obtained. The total quantity obtained is thus 435 grams (86 percent yield).

The recommended dosage during the first 24 hours following infarction is as follows:

2–4 grams by phleboclysis; 1–2 ampoules (each ampoule containing 2,000 mg of the sodium salt of the compound of Example 1 dissolved in sufficient sterilized distilled water to make 10 cc) dissolved in 400–600 cc of saline solution.

2–4 grams by intravenous administration; 2–4 ampoules divided into 2–4 administrations (each ampoule containing 1,000 mg of the sodium salt of the compound of Example 1 dissolved in sufficient sterilized distilled water to make 10 cc).

2 grams by intramuscular administration; 8 ampoules divided into 4 administrations (each ampoule containing 250 mg of the sodium salt of the compound of Example 1 and sufficient sterilized distilled water to make 3 cc).

4–6 grams by oral administration; 8–12 tablets (each tablet containing 500 mg of the sodium salt of the compound of Example 1 and sufficient excipient to make one tablet).

4–6 grams by oral administration; 8–12 ampoules (each ampoule containing one or two grams of the sodium salt of the compound of Example 1 in sufficient sterilized distilled water to make 10 cc).

In the third or fourth day after start of therapy, the dosage can be reduced to half the above amounts. The therapy should not be interrupted before the third week after heart infarction has occurred.

Both in the attack phrase and in the maintenance stage the therapy can be carried out using one or more of the different forms of administration.

I claim:

1. A compound represented by the formula

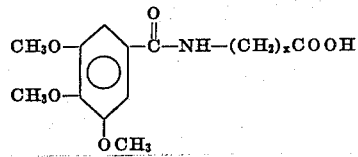

wherein $x$ is an integer of 3–8 and pharmaceutically acceptable salts thereof.

2. The compound of claim 1 where $x$ is 3.
3. The compound of claim 1 where $x$ is 4.
4. The compound of claim 1 where $x$ is 5.
5. The compound of claim 1 where $x$ is 7.

* * * * *